Patented Feb. 3, 1942

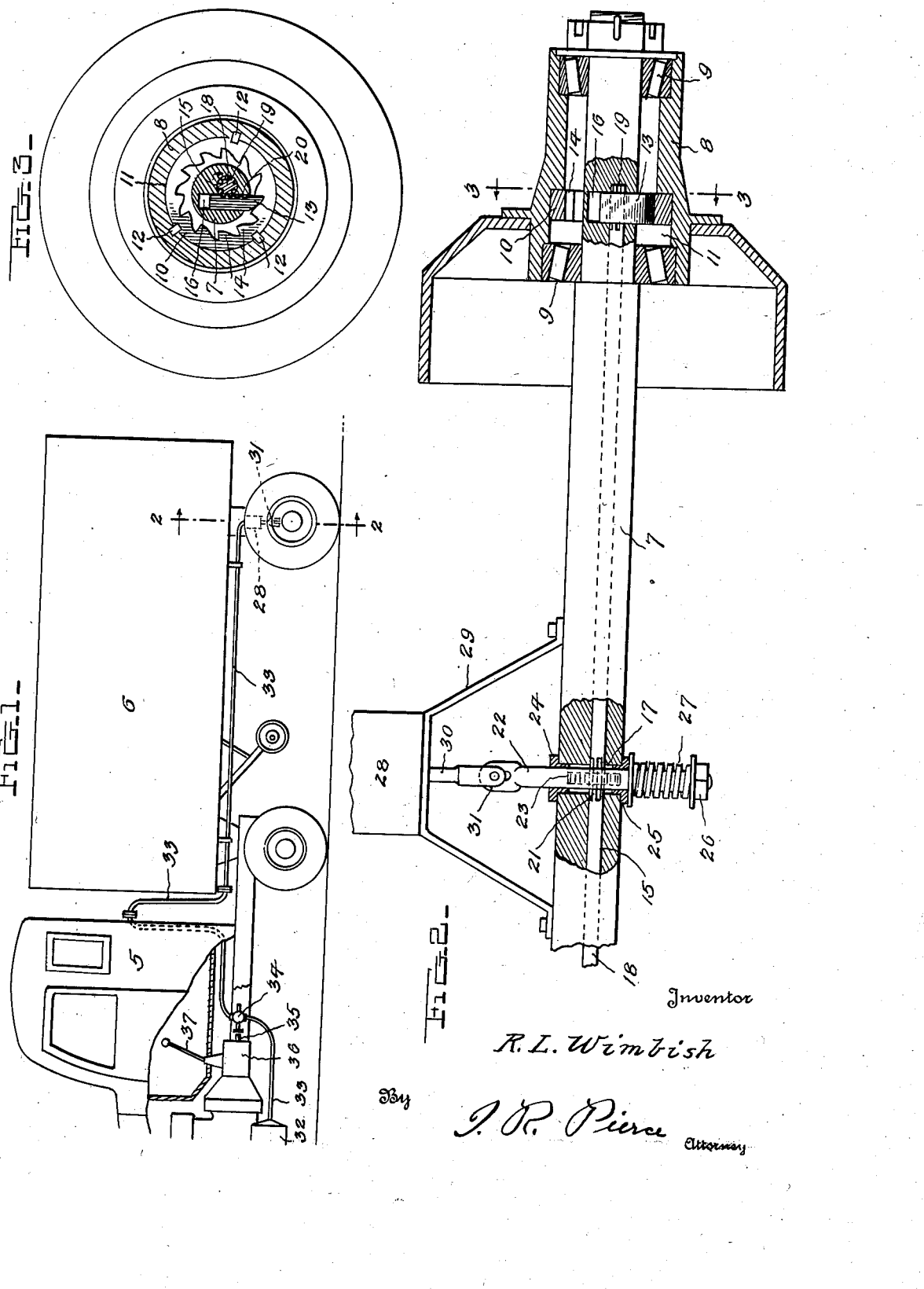

2,272,028

UNITED STATES PATENT OFFICE 2,272,028

SAFETY ANTIBACKING MEANS FOR TRAILERS

Raymond Lee Wimbish, Danville, Va.

Application November 4, 1940, Serial No. 364,286

5 Claims. (Cl. 192—4)

In various tractor and trailer combinations, a serious hazard exists in case of any mechanical failure freeing the trailer from the tractor vehicle while traveling upgrade, permitting the trailer to roll rearwardly, and an equal hazard is often present should a trailer standing uncoupled from the truck or other tractor vehicle roll rearwardly down hill, for example while loading or unloading. Serious accidents from these causes are becoming increasingly frequent with greater development of the trucking industry, and the constantly increasing numbers of trailers drawn by passenger cars, for dwellings, boat transportation, etc. In spite of the obvious need for a safety appliance which will prevent such occurrences, no truly practicable means for meeting requirements, is available, insofar as I am aware, and it is the object of my invention to supply this need by providing the trailer with novel anti-backing means preventing it from rolling rearwardly until released.

In carrying out the above end, a further object is to make provision, preferably of pneumatic nature, for automatically releasing the anti-backing means of the trailer when the reversing mechanism of the tractor is set for operation.

A still further aim is to associate the antibacking means and the releasing means, with the trailer axle, in a novel and advantageous manner.

With the foregoing in view, the invention resides in the novel subject matter hereinafter described and claimed, description being accomplished by reference to the accompanying drawing.

Figure 1 is a fragmentary side elevation, partly in section, showing a tractor and trailer combination equipped with the invention.

Figure 2 is an enlarged vertical sectional view partly in elevation, as indicated by line 2—2 of Fig. 1.

Figure 3 is a vertical sectional view on line 3—3 of Fig. 2, the trailer wheel being removed from the hub.

The general construction selected for illustration may be considered as preferred, with the understanding, however, that variations may be made within the scope of the invention as claimed.

A portion of a tractor is illustrated at 5 and a trailer at 6, said trailer being provided with a dead axle 7 upon which the hubs 8 of the trailer wheels are rotatably mounted by means of bearings 9.

Within each of the hubs 8 is a ratchet ring 10. The inner end of the hub, in the present disclosure, is provided with a counterbore 11 into which the ring 10 is tightly pressed, said hub and ring being keyed together at 12.

For cooperation with the ratchet rings 11, I provide dogs 13 carried by the axle 7. During forward travel of the trailer, these dogs 13 merely click idly over the ratchet teeth 14 of the rings 10 but in case of any tendency of the trailer to accidentally roll rearwardly, said dogs and teeth immediately function to prevent such rolling.

The axle 7 is provided with a longitudinal bore 15, with transverse openings 16 at one side of said bore and with another opening 17 also at one side of said bore. The openings 16 are formed in the end portions of the axle and they slidably receive the dogs 13. The opening 17 may well be at any desired point between the axle ends. A rotatable rod or shaft 18 is mounted in the bore 15 and is provided with gear teeth 19 meshing with rack teeth 20 on the dogs 13. This shaft 18 is also provided with other gear teeth 21 at the opening 17. A rack 22 extends slidably through this opening 17 and its teeth 23 mesh with the gear teeth 21, suitable bearings 24 and 25 being provided for said rack. One end of the rack 22 is equipped with a suitable abutment 26, and a compression spring 27 surrounds said rack between said abutment and the bearing 25. The action of this spring 27 on the rack 22 yieldably urges this rack downwardly and thus causes the shaft 18 to urge the dogs 13 into proper engagement with the ratchet rings 11, said spring, however, permitting the necessary movement of parts as said dogs click over the ratchet teeth 14.

A pneumatic unit 28 such as a cylinder-and-piston-assembly, or a casing-and-diaphragm-assembly, is suitably mounted at 29 on the axle 7, and its movable element 30 is connected with the rack 22 by a slip connection 31 which permits the necessary movement of said rack during idle clicking of the dogs 13 over the ratchet teeth 14. Whenever the unit 28 is operated, however, it actuates the rack 22 (moving it upwardly in the present disclosure) to rotate shaft 18 and release the dogs 13, and it will be obvious that said unit may be constructed to operate under the influence of plus pressure or minus pressure. A source of minus pressure is indicated at 32 on the tractor 5, and an air conducting line 33 extends from said source 32 to the unit 28, said line 33 having a valve 34 which of course normally opens the unit 28 to the atmosphere. This valve is so associated with the reversing mechanism of the tractor 5 that setting of said reversing mechanism in readiness for operation will automatically operate said valve, to cause operation of the pneumatic unit 28, thereby effecting release of the dogs 13. For illustrative purposes, the valve 34 has been shown mounted in position to be operated by the rod 35 of the tractor transmission 36, which rod is moved rearwardly by the usual gear shift lever 37 to shift the tractor into reverse.

It will be seen from the foregoing that novel and advantageous provision has been made to prevent accidental rearward rolling of both the tractor and the trailer when they are connected, and to prevent rearward rolling of said trailer should it break loose from said tractor and when it is intentionally uncoupled, and that this antibacking means will be automatically released when the tractor and trailer must be backed by power.

As excellent results may be obtained from the general construction shown and described, it may be followed if desired. However, attention is again invited to the possibility of making variations within the scope of the invention as claimed.

What is claimed is:

1. A trailer having a dead axle and wheels thereon, said axle having a longitudinal bore and at least two transverse openings from said bore to the exterior of the axle, one of said openings being near one of said wheels, a slidable dog mounted in said one of said openings and projecting therefrom, said dog having rack teeth at one side of said bore, ratchet teeth on said one of said wheels cooperable with said dog to prevent rearward rolling of the trailer, a slidable rack mounted in the other of said openings and having rack teeth at one side of said bore, a rotatable shaft extending longitudinally within said bore and having two sets of gear teeth meshing with said rack teeth of said dog and said rack respectively, and means connected with said rack for operating the same to rotate said shaft and release said dog from engagement with said ratchet teeth.

2. A trailer having a dead axle and wheels thereon, said axle having a longitudinal bore and at least two transverse openings from said bore to the exterior of the axle, one of said openings being near one of said wheels, a slidable dog mounted in said one of said openings and projecting therefrom, said dog having rack teeth at one side of said bore, ratchet teeth on said one of said wheels cooperable with said dog to prevent rearward rolling of the trailer, a slidable rack mounted in the other of said openings and having rack teeth at one side of said bore, a rotatable shaft extending longitudinally within said bore and having two sets of gear teeth meshing with said rack teeth of said dog and said rack respectively, and a pressure-actuated unit mounted on said axle and connected with said rack for operating the same to rotate said shaft and release said dog from engagement with said ratchet teeth 3. In a tractor and trailer combination, the tractor of which is provided with reversing mechanism, self-applied trailer-wheel-holding ratchet means carried by the trailer for automatically holding both tractor and trailer against rearward rolling as long as said tractor and trailer are connected and for automatically holding said trailer against rearward rolling when accidentally or purposely uncoupled from the tractor, and pneumatic releasing means for said trailer-carried wheel holding means extending from the tractor to the trailer and including a controlling valve actuated by said reversing mechanism of the tractor, to automatically release said wheel holding means when said reversing mechanism is set for operation.

4. In a tractor and trailer combination, the tractor of which is provided with reversing mechanism, self-applied trailer-wheel-holding ratchet means carried by the trailer for automatically holding both tractor and trailer against rearward rolling as long as said tractor and trailer are connected and for automatically holding said trailer against rearward rolling when accidentally or purposely uncoupled from the tractor, a pneumatically actuated unit on the trailer operatively connected with said wheel holding means for releasing same, a source of pneumatic pressure on the tractor, and an air-conducting line from said source to said unit to actuate the latter, said line having an air control valve actuated by said reversing mechanism of the tractor to cause release of said wheel holding means when said reversing mechanism is set for operation.

5. A trailer having a dead axle and wheels thereon, said axle being provided substantially throughout its length with a longitudinal bore, coacting means carried by said axle and said wheels for holding the trailer against rearward rolling, a single rod extending longitudinally within and substantially throughout the length of said axle bore and operatively associated with said axle-carried means for releasing the latter from engagement with said wheel-carried means when said rod is actuated, and means operatively connected with said rod for actuating the same.

RAYMOND LEE WIMBISH.